United States Patent

Collins et al.

[15] 3,676,668

[45] July 11, 1972

[54] SOLID STATE LAMP ASSEMBLY

[72] Inventors: Neil E. Collins, Richmond Heights; Elwyn W. Kerber; Raymond R. Neville, both of Mayfield Heights, all of Ohio

[73] Assignee: General Electric Company

[22] Filed: Dec. 29, 1969

[21] Appl. No.: 888,485

[52] U.S. Cl. ........................240/103 R, 240/8.16, 240/41.3, 313/108 D

[51] Int. Cl. ....................B60q 3/04, F21v 7/14, H05b 33/12

[58] Field of Search ....................240/41.3, 41.4, 106.1, 103, 240/8.16, 41.35 R, 103 R; 313/108 D; 307/311; 317/234; 250/217 SS

[56] References Cited

UNITED STATES PATENTS

| | | | |
|---|---|---|---|
| 3,290,539 | 12/1966 | Lamorte | 307/311 X |

FOREIGN PATENTS OR APPLICATIONS

| | | | |
|---|---|---|---|
| 1,243,268 | 6/1967 | Germany | 313/108 |
| 1,044,486 | 9/1966 | Great Britain | 313/108 |
| 802,489 | 12/1968 | Canada | 313/108 D |

OTHER PUBLICATIONS

IBM– TDB– " Gallium Arsenide Light-Emitting Diode" –Roy+Yeh Vol. 7, No. 1, June, 1964, pp. 61 & 62

IBM– TDB– " High Efficiency Electroluminescent Diodes" –Shah– Vol. 9, No. 7, December, 1966, pp. 947– 948

*Primary Examiner*—Richard C. Queisser
*Assistant Examiner*—C. E. Snee, III
*Attorney*—Norman C. Fulmer, Henry P. Truesdell, Frank L. Neuhauser, Oscar B. Waddell and Joseph B. Forman

[57] ABSTRACT

A light-emitting diode element is mounted on a supporting tab, in a depression thereof having polished tapered sides. A dimple is provided in the depression, at the underside of the diode, so that only a small area of the bottom surface of the diode is in contact with the tab, thereby maximizing internal light reflection at the bottom surface and thus increasing the amount of light usefully emitted through the top and sides of the diode. The polished tapered sides of the depression in the tab reflect upwardly the light emitted through the sides of the diode, so as to be useful along with light emitted through the top of the diode. The assembly is encapsulated in glass or plastic.

8 Claims, 4 Drawing Figures

Inventors:
Neil E. Collins
Elwyn W. Kerber
Raymond R. Neville
by Norman C. Fulmer
Their Attorney

SOLID STATE LAMP ASSEMBLY

BACKGROUND OF THE INVENTION

The invention is in the field of solid state lamp assemblies. Such lamps are usually made from a flat "chip" of material, such as gallium arsenide, gallium phosphide, or silicon carbide, suitably doped with dopant material so as to form a p-n junction which emits light (visible or infrared) when current is passed therethrough. Of the light emitted by the junction, only a small fraction exits through the surface of the diode, due to the "critical angle" of the diode material whereby most of the light becomes reflected and absorbed within the diode material. The relatively small amount of light that does exit through the diode surface becomes refracted so as to form a hemispherical or Lambertian light distribution pattern externally of the diode. For the foregoing reasons, solid state light sources are inefficient and produce light of low intensity, and considerable effort has been devoted towards increasing their efficiency and light output.

One way of increasing the efficiency and light output of a light-emitting diode, is to shape the diode material into the form of a sphere or partial sphere, with the light-producing junction located in the region between the center and the Weierstrass radius of the sphere. This technique is not entirely feasible, since the diode material is expensive, and difficult to machine spherically, and has a high coefficient of light absorption whereby the greater amount of material required for forming the sphere absorbs a considerable amount of light. Another technique, somewhat similar in effect to that just described, is to encapsulate a light-emitting diode chip at a point between the center and the Weierstrass radius of a spherically shaped material having a refractive index greater than unity, i.e., greater than that of air, thereby increasing the critical angle of the diode whereby a greater amount of light exits from the diode surface.

Although the prior art techniques for improving the light output of solid state lamps have been helpful, there has been a need for inventing arrangements for further increasing the efficiency and light output, and for doing so in a manner that is feasible and economical to manufacture.

SUMMARY OF THE INVENTION

Objects of the invention are to provide an improved solid state lamp assembly, and to provide a solid state lamp assembly having increased efficiency and light output.

The invention comprises, briefly and in a preferred embodiment, a mounting or supporting tab provided with a depression having polished reflective tapered sides. A light-emitting diode element is mounted on the tab, in the depression thereof. A dimple is provided in the depression, at the underside of the diode, so that only a small area of the bottom surface of the diode is in contact with the tab. Preferably, the dimple is circular and the diode element is square, such that only the corner areas of the diode element are in contact with the tab. This construction minimizes the light-exiting critical angle of the bottom surface of the diode, thereby maximizing internal light reflection at the bottom surface and thus increasing the amount of light usefully emitted through the top and sides of the diode. The polished tapered sides of the depression in the tab reflect upwardly the light emitted through the sides of the diode element, so as to contribute to the useful light output of the lamp along with the light emitted through the top of the diode element. The assembly may be encapsulated in plastic or glass, electrical connections being provided to the top of the diode element, and to the bottom thereof via the tab on which it is mounted.

DESCRIPTION OF THE PREFERRED EMBODIMENT

Figure 1:
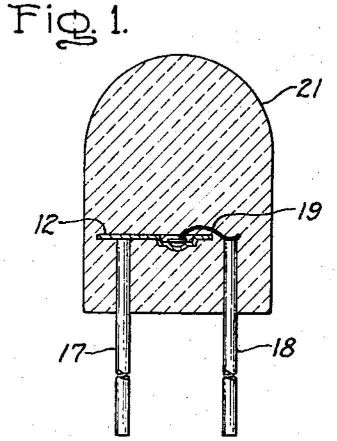
FIG. 1 is a cross-sectional side view of a preferred embodiment of the invention.
Figure 2:
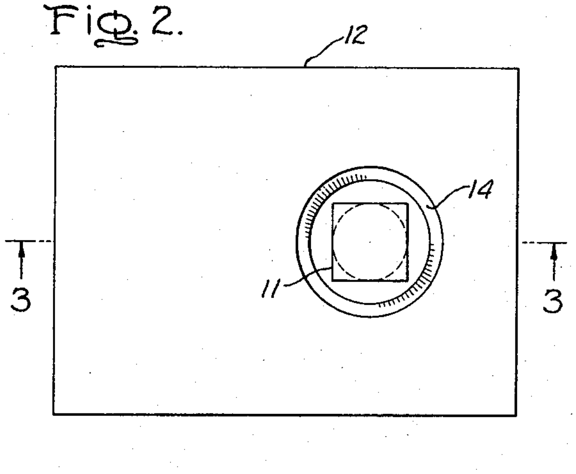
FIG. 2 is a top view of a diode element mounted on its support tab.
Figure 4:
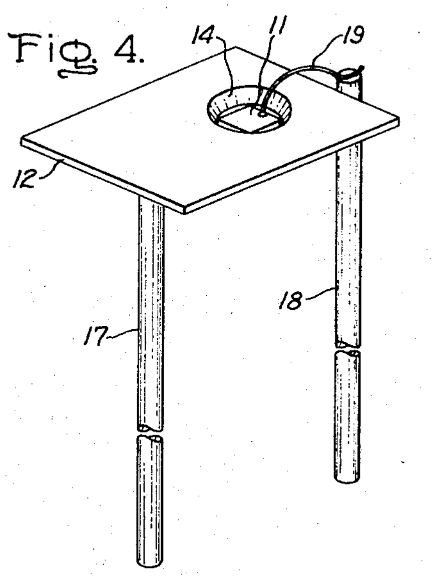
FIG. 4 is a perspective view of the lamp assembly prior to encapsulation.
Figure 3:
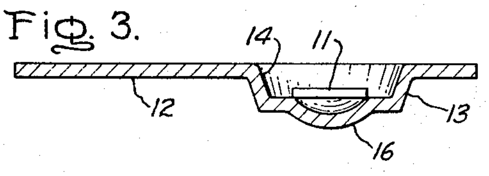
FIG. 3 is a cross-sectional view of FIG. 2 taken on the line 3—3 thereof.

The preferred embodiment of the invention, as shown in the drawing, comprises a solid state light-emitting diode element 11 mounted on a metal tab 12. The tab 12 is provided with a depression 13 having polished tapered sidewalls 14. A dimple 16 is provided concentrically in the bottom of the depression 13. The diode 11 is flat and square, the length of each side thereof being approximately equal to the inner diameter of the dimple 16. The diode 11 is mounted on the tab 12 in the depressed region 14 over the dimple 16, the bottom corner areas of the diode 11 being electrically and mechanically attached to the tab 12 by means of soldering or other suitable means. The tab 12 is attached to an electrical terminal post 17. A second electrical terminal post 18 is spaced from the post 17, and a connector wire 19 is connected electrically between the top of the post 18 and the top of the diode 11. The tab 12, diode 11, connector wire 19, and upper portions of the connector posts 17 and 18, are encapsulated by a material 21 such as a glass or plastic of acrylic type, or a resin, which optically transmits the light produced by the diode 11, and which is shaped to provide a desired focusing or shaping of the light rays. For further details of the light-emitting diode 11, reference is made to U.S. Pat. No. 3,458,779, issued July 29, 1969 to Drs. Blank and Potter and assigned to the same assignee as the present invention.

It is well known that the optical critical angle of the light-emitting diode surface becomes increased, whereby more light is emitted through the surface, if the surface is bounded by material having a refractive index greater than air. We have found that metal, such as the tab 12 on which the diode element 11 is mounted, and/or the cement or solder which secures the diode element to the metal, absorbs and dissipates the light at the bonded surface of the diode. In accordance with a feature of the invention, most of the bottom surface of the diode element 11 is bounded by air (or, alternatively, nitrogen or other material of low optical index), thereby minimizing the critical angle at the bottom surface and maximizing internal light reflection at the bottom surface and thus increasing the amount of useful light output from the top and sides of the diode element. The polished tapered sides 14 of the depression 13, reflect upwardly the light emitted through the sides of the diode element 11, thus further increasing the efficiency and light output of the lamp. A suitable angle for the tapered sides 14 is about 30 to 45 degrees with respect to the vertical axis.

The encapsulant 21 is of a material having a relatively high refractive index, and, being in contact with the top and sides of the diode element, it increases the optical critical angle of these surfaces and hence increases the amount of light emitted therethrough. The upper portion of the encapsulant 21 is rounded in a hemispherical shape, and the diode element 11 is positioned at or between the center and the Weierstrass radius of the hemisphere, to obtain desired distribution of the light output of the lamp. The encapsulant 21, in addition to the above functions, also functions to maintain in relative positions the leads 17, 18 and adjoining structures.

The drawing shows the lamp and its parts on an enlarged scale for clarity. In a preferred size of construction, for example, the encapsulant is about one-fourth of an inch in height.

It will be apparent that the invention, in addition to considerably increasing the efficiency and light output of a solid state lamp, is feasible and economical to manufacture, and it eliminates the customary large circular header used for mounting the diode element.

While a preferred embodiment of the invention has been shown and described, other embodiments and modifications will become apparent to persons skilled in the art, and will be within the scope of the invention as defined in the following claims.

What we claim as new and desire to secure by Letters Patent of the United States is:

1. A solid state lamp comprising a substantially flat light-emitting diode element having a top surface and a bottom surface, said diode element containing means for producing light internally thereof directed upwardly toward said top surface and downwardly toward said bottom surface, mounting means to which said element is attached at said bottom surface thereof for supporting said element and for making an electrical connection therewith, and electrical contact means at a relatively small area of said top surface, said top surface being substantially unobstructed optically to the emission of light upwardly therefrom, wherein the improvement comprises means for providing said supporting and electrical attachment to only a portion of said bottom surface of the light-emitting element whereby a major portion of said bottom surface is bounded by air or other low optical refractive index material thereby minimizing the optical critical angle at said bottom surface and maximizing the internal reflection of said internally produced light at said bottom surface thereby increasing the amount of light emitted upwardly from said top surface of the diode element.

2. A lamp as claimed in claim 1, in which said mounting means is provided with a concave dimple on the surface thereof, said light-emitting element being positioned over at least a portion of said dimple and attached at the edge of the bottom surface thereof to said mounting means, whereby said dimple defines a space bounding a substantial area of said bottom surface of the diode.

3. A lamp as claimed in claim 2, in which said light-emitting element is substantially square, and in which said dimple is circular and has a diameter less than the diagonal of said light-emitting element, said light-emitting element being attached only near the corners thereof to said mounting means.

4. A solid state lamp comprising a light-emitting diode element having a top surface and a bottom surface, wherein the improvement comprises a substantially flat supporting tab of electrically conductive material provided with a depression having a bottom surface and having reflective tapered sides tapering mutually inwardly toward said bottom surface, and means mounting said light-emitting element to said supporting tab in said depression thereof with only a portion of said bottom surface of the diode element being in contact with said bottom surface of the depression, whereby a major portion of said bottom surface of the diode is bounded by air or other low optical refractive index material thereby minimizing the optical critical angle at said bottom surface of the diode element.

5. A lamp as claimed in claim 4, in which said bottom surface of the depression is provided with a concave dimple, said light-emitting element being positioned over at least a portion of said dimple and attached at the edge of the bottom surface thereof to said bottom surface of the depression, whereby said dimple defines a space bounding a substantial area of said bottom surface of the diode.

6. A lamp as claimed in claim 5, in which said light-emitting element is substantially square, and in which said dimple is circular and has a diameter less than the diagonal of said light-emitting element, said light-emitting element being attached only near the corners thereof to said bottom surface of the depression.

7. A lamp as claimed in claim 6, including a pair of electrical connector leads for said lamp, means connecting a first of said leads to a point on said light-emitting element, means connecting the other of said leads to said supporting tab, and an encapsulant positioned to encapsulate and maintain in relative position said light-emitting element and its supporting tab, said connecting means, and portions of said electrical connector leads.

8. A lamp as claimed in claim 7, in which the surface of said encapsulant above the top surface of said light-emitting element is curved substantially hemispherically for affecting the output light distribution of said lamp.

* * * * *